United States Patent
Bae et al.

(10) Patent No.: US 11,204,746 B2
(45) Date of Patent: Dec. 21, 2021

(54) ENCODING DEPENDENCIES IN CALL GRAPHS

(71) Applicant: Oracle International Corporation, Redwood Shores, CA (US)

(72) Inventors: Sora Bae, Carindale (AU); Nathan Robert Albert Keynes, Brisbane (AU); Cristina Cifuentes, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/775,120

(22) Filed: Jan. 28, 2020

(65) Prior Publication Data

US 2021/0232377 A1 Jul. 29, 2021

(51) Int. Cl.
| | |
|---|---|
| G06F 8/41 | (2018.01) |
| G06F 21/51 | (2013.01) |
| G06F 21/57 | (2013.01) |
| G06F 21/56 | (2013.01) |

(52) U.S. Cl.
CPC .............. *G06F 8/433* (2013.01); *G06F 21/51* (2013.01); *G06F 21/563* (2013.01); *G06F 21/577* (2013.01); *G06F 2221/033* (2013.01)

(58) Field of Classification Search
CPC ........ G06F 8/433; G06F 21/51; G06F 21/577; G06F 2221/033
USPC ................................. 717/141, 144, 152–157
See application file for complete search history.

(56) References Cited

U.S. PATENT DOCUMENTS

| | | | | |
|---|---|---|---|---|
| 5,943,499 A | * | 8/1999 | Gillies ..................... | G06F 8/441 717/155 |
| 8,893,102 B2 | * | 11/2014 | Keynes ..................... | G06F 8/74 717/157 |
| 2003/0066055 A1 | * | 4/2003 | Spivey ..................... | G06F 11/28 717/131 |
| 2004/0226006 A1 | * | 11/2004 | Russell ..................... | G06F 30/30 717/154 |

(Continued)

OTHER PUBLICATIONS

Wang, K., et al., Graspan: A Single-machine Disk-based Graph System for Interprocedural Static Analyses of Large-scale Systems Code, ASPLOS '17, Apr. 2017, pp. 389-404, [retrieved on Mar. 6, 2021], Retrieved from the Internet: <URL:http://dl.acm.org/>.*

(Continued)

*Primary Examiner* — Geoffrey R St Leger
(74) *Attorney, Agent, or Firm* — Ferguson Braswell Fraser Kubasta PC

(57) ABSTRACT

A method for modifying a call graph may include identifying, in source code, a first call site including a first predicate and a call from a first function to a second function. The first call site may correspond to a first edge of the call graph. The first edge may connect a first node corresponding to the first function and a second node corresponding to the second function. The method may further include modifying the call graph by labelling the first edge with a first encoding of the first predicate, and identifying, in the source code, a second call site including a second predicate and a call from a third function to the first function. The method may further include in response to determining that the first predicate is unsatisfied, modifying the call graph by labelling the second edge with a second encoding of a violation of the first predicate.

18 Claims, 6 Drawing Sheets

(56) References Cited

U.S. PATENT DOCUMENTS

| | | | | |
|---|---|---|---|---|
| 2006/0150168 A1* | 7/2006 | Mitchell | ............. | G06F 12/0253 717/156 |
| 2008/0127106 A1* | 5/2008 | Ward | ........................ | G06F 8/75 717/127 |
| 2014/0344633 A1* | 11/2014 | Li | ........................ | G06F 11/0784 714/57 |
| 2016/0378491 A1* | 12/2016 | Burger | .................. | G06F 9/3804 712/1 |
| 2017/0344351 A1* | 11/2017 | Miyoshi | ................ | G06F 8/4443 |
| 2019/0007446 A1* | 1/2019 | Ando | .................. | H04L 63/1408 |

OTHER PUBLICATIONS

Xu, B., et al., Dependence Analysis for Recursive Java Programs, ACM SIGPLAN Notices, Dec. 2001, pp. 70-76, [retrieved on Mar. 9, 2021], Retrieved from the Internet: <URL:http://dl.acm.org/>.*

LaToza, T. D., et al., Visualizing Call Graphs, 2011 IEEE Symposium on Visual Languages and Human-Centric Computing, 2011, pp. 117-124, [retrieved on Mar. 12, 2021], Retrieved from the Internet: <URL:http://ieeexplore.ieee.org/>.*

Snelting, G., et al., Efficient Path Conditions in Dependence Graphs for Software Safety Analysis, ACM Transactions on Software Engineering and Methodology, vol. 15, Issue 4, Oct. 2006, pp. 410-457, [retrieved on Aug. 19, 2021], Retrieved from the Internet: <URL:http://dl.acm.org/>.*

Upadhyaya, G., et al., On Accelerating Source Code Analysis at Massive Scale, IEEE Transactions on Software Engineering, vol. 44, Issue: 7, Jul. 1, 2018, pp. 669-688, [retrieved on Aug. 19, 2021], Retrieved from the Internet: <URL:http://ieeexplore.ieee.org/>.*

Angerer, F., et al., "Identifying Inactive Code in Product Lines with Configuration-Aware System Dependence Graphs", SPLC' 14, Sep. 15-19, 2014, 10 pages.

Badri, L., et al. "Supporting Predictive Change Impact Analysis: A Control Call Graph Based Technique", Proceedings of the 12th Asia-Pacific Software Engineering Conference, Dec. 1, 2005 (9 pages).

Robschink, T., et al. "Efficient Path Conditions in Dependence Graphs" ICSE'02, May 19-25, 2002 (11 pages).

* cited by examiner

Source Code 300

```
1  int first_entry() {
2      foo(0);              Call Site #1
3  }                          302A
4  int second_entry() {
5      foo(1);              Call Site #2
6  }                          302B
                           Predicate #3
7  void foo(int x) {         304C
8      if (x >= 0) {
                           Call Site #3
9          bar(x);           302C
10     }
11 }                              Call Site #4
                           Predicate #4    302D
12 void bar(int y) {         304D
13     if (y != 0) {
14         security_sensitive_ftn();
15     }
16 }
```

FIG. 3

ENCODING DEPENDENCIES IN CALL GRAPHS

BACKGROUND

Call graphs are often used in static program analysis and program comprehension. For example, a bug may exist when there is a call path (e.g., execution path) between two functions (program analysis). Alternatively, a developer may wish to identify all code that is reachable (e.g., executable) from a particular point in the code (program comprehension). A call graph typically includes nodes corresponding to functions and directed edges corresponding to call sites. A call path may be expressed as a sequence of edges in the call graph that connect two nodes. However, the call graph may be imprecise since the call graph may contain call paths that are not feasible execution paths at runtime due to control flow constraints. Solving such control flow constraints may be inefficient (i.e., unscalable) when the call graph is large. For example, the call graph may represent execution paths in a large codebase.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for modifying a call graph including identifying, in source code, a first call site including a first predicate and a call from a first function to a second function. The first call site corresponds to a first edge of the call graph. The first edge connects a first node corresponding to the first function and a second node corresponding to the second function. The first predicate includes a Boolean expression. The call graph is generated for the source code. The method further includes modifying the call graph by labelling the first edge with a first encoding of the first predicate, and identifying, in the source code, a second call site including a second predicate and a call from a third function to the first function. The second call site corresponds to a second edge of the call graph. The method further includes determining, using the second call site, that the first predicate is unsatisfied, and in response to determining that the first predicate is unsatisfied, modifying the call graph by labelling the second edge with a second encoding of a violation of the first predicate.

In general, in one aspect, one or more embodiments relate to a system for modifying a computer processor, a repository configured to store source code including a first call site including a first predicate and a call from a first function to a second function. The first call site corresponds to a first edge of the call graph. The first edge connects a first node corresponding to the first function and a second node corresponding to the second function. The first predicate includes a Boolean expression. The source code further includes a second call site including a second predicate and a call from a third function to the first function. The second call site corresponds to a second edge of the call graph. The call graph is generated for the source code. The system further includes a constraint solver, executing on the computer processor and configured to determine, using the second call site, that the first predicate is unsatisfied. The system further includes a code analyzer, executing on the computer processor and configured to identify, in the source code, the first call site, modify the call graph by labelling the first edge with a first encoding of the first predicate, identify, in the source code, the second call site, and in response to determining that the first predicate is unsatisfied, modify the call graph by labelling the second edge with a second encoding of a violation of the first predicate.

In general, in one aspect, one or more embodiments relate to a non-transitory computer readable medium including instructions that, when executed by a computer processor, perform: identifying, in source code, a first call site including a first predicate and a call from a first function to a second function. The first call site corresponds to a first edge of the call graph. The first edge connects a first node corresponding to the first function and a second node corresponding to the second function. The first predicate includes a Boolean expression. The call graph is generated for the source code. The instructions further perform modifying the call graph by labelling the first edge with a first encoding of the first predicate, and identifying, in the source code, a second call site including a second predicate and a call from a third function to the first function. The second call site corresponds to a second edge of the call graph. The instructions further perform determining, using the second call site, that the first predicate is unsatisfied, and in response to determining that the first predicate is unsatisfied, modifying the call graph by labelling the second edge with a second encoding of a violation of the first predicate.

Other aspects of the invention will be apparent from the following description and the appended claims.

BRIEF DESCRIPTION OF DRAWINGS

FIG. 3, FIG. 4A, and FIG. 4B show examples in accordance with one or more embodiments of the invention.

DETAILED DESCRIPTION

Figure 1A:
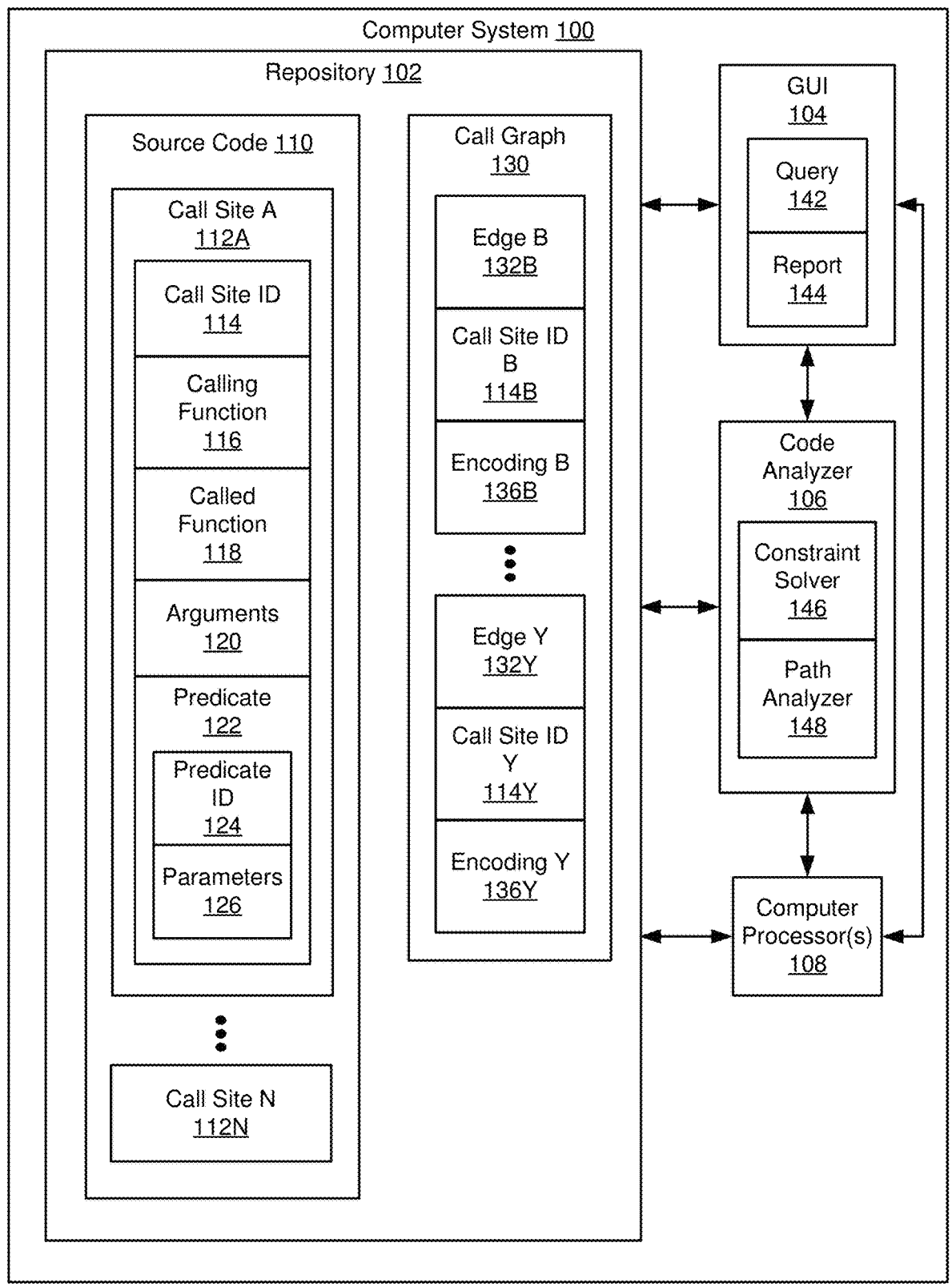
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to modifying a call graph. In one or more embodiments, during an offline phase, a call graph is traversed while determining whether predicates are satisfied at various call sites corresponding to edges in the call graph. A predicate may be an arbitrarily complex Boolean expression that determines whether a call is executed at a call site. The call graph may be modified by labeling call graph edges to encode, using a compressed, space-efficient representation, information regarding the satisfaction of predicates at call sites. The modified call graph is then used during an online phase that executes queries regarding call paths (e.g., execution paths) in the call graph by performing a quick determination regarding the feasibility of call paths.

FIG. 1A shows a computer system (100) in accordance with one or more embodiments of the invention. As shown in FIG. 1A, the computer system (100) includes a repository (102), a graphical user interface (GUI) (104), a code analyzer (106), and one or more computer processors (108). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (108) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes source code (110) and a call graph (130). In one or more embodiments, the source code (110) is a collection of source code including various software components. That is, the source code (110) may be any collection of computer instructions (e.g., statements) written in a human-readable programming language, or intermediate representation (e.g., byte code). The source code (110) may be transformed by a compiler into binary machine code. Compiled machine code may be executed by the processor (108) in order to execute the software components generated from the source code (110). In one or more embodiments, the source code (110) may be any collection of object code (e.g., machine code generated by a compiler) or another form of the source code (110).

In one or more embodiments, the source code (110) includes call sites (112A, 112N). In one or more embodiments, a call site (112A) is a location in the source code (110) where a calling function (116) calls (e.g., invokes) a called function (118) with arguments (120). The call site (112A) may correspond to a call site ID (114). For example, the call site ID (114) may be an identifier based on a line number of the call site (112A) in the source code (110). Alternatively, a series of numbers may be used as call site IDs (114). The calling function (116) and the called function (118) may be methods, procedures, etc. Both the calling function (116) and the called function (118) may produce return values in response to inputs.

The arguments (120) may be expressions. For example, an expression may be a regular expression. An expression may include an operation applied to one or more values. A value may include constants, variables and/or sub-expressions. For example, a value may be a recursive structure such that the value is an expression (e.g., a sub-expression) that includes other values, which in turn may be expressions, constants, variables, etc. The operation may be any operation that accepts one or more inputs and produces one or more outputs. For example, the operation may be an arithmetic operation, a Boolean operation, a string operation, etc.

In one or more embodiments, the call from the calling function (116) to the called function (118) is a conditional call that is executed depending on the value of a predicate (122). The predicate (122) may be a Boolean expression. For example, the call from the calling function (116) to the called function (118) may be executed when the predicate (122) evaluates to "true". Conversely, the call from the calling function (116) to the called function (118) may be omitted (e.g., not executed) when the predicate (122) evaluates to "false". The predicate (122) may correspond to a predicate ID (124). For example, the predicate ID (124) may be an identifier based on a line number of the predicate (122) in the source code (110). Alternatively, a series of numbers may be used as predicate IDs (124). The predicate (122) may include parameters (126). The parameters (126) may be arguments (120) of the calling function (116). For example, the parameters (126) may be assigned the values of the arguments (120) passed to the called function (118) by the calling function (116).

In one or more embodiments, the call from the calling function (116) to the called function (118) is an unconditional call that is executed whenever the call site (112A) is reached. In other words, the unconditional call may correspond to a call site (112A) without a corresponding predicate (122).

Continuing with FIG. 1, the call graph (130) indicates which functions call which other functions in the source code (110). The call graph (130) may include edges (132B, 132Y). Each edge (132B, 132Y) connects two nodes. Each node may correspond to a function (e.g., calling function (116), called function (118), etc.). A series of connected edges (132B, 132Y) is referred to as a call path (e.g., an execution path). A call path represents a series of call sites (112A, 112N) corresponding to a series of function calls. A call path is feasible when it is possible to satisfy the predicate (122) of each call site (112A) in the call path. In contrast, a call path is infeasible when it is impossible to satisfy at least one predicate (122) of a call site (112A) in the call path.

An edge (132B) may be referred to as a root edge when the edge (132B) corresponds to a call site (112A) whose calling function (116) is a function that represents a starting point for one or more call paths being analyzed. Conversely, an edge (132B) may be referred to as a leaf edge when the edge (132B) corresponds to a call site (112A) whose called function (118) is a function that represents an ending point for the one or more call paths being analyzed. Two edges are connected to each other when the calling function (116) of the call site corresponding to one edge is also the called function (118) of the call site corresponding to the other edge. For example, edge A and edge B are connected to each other when edge A corresponds to a call site where function A calls function B, and edge B corresponds to a call site where function C calls function A.

Figure 1B:
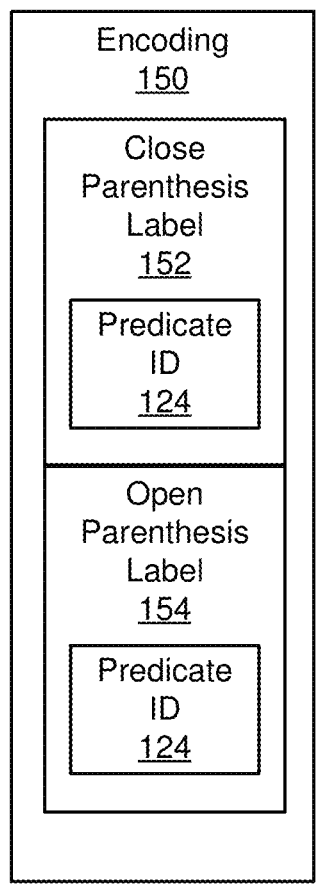

Each edge (132B, 132Y) may be labeled with a call site ID (114B, 114Y) and an encoding (136B, 136Y). Turning to FIG. 1B, in one or more embodiments, the encoding (150) is a close parenthesis label (152). The close parenthesis label (152) includes a predicate ID (124). The close parenthesis label (152) indicates that the labeled edge (132B) corresponds to the predicate (122) identified by the predicate ID (124). Alternatively, in one or more embodiments, the encoding (150) is an open parenthesis label (154). The open parenthesis label (154) includes a predicate ID (124). The open parenthesis label (154) indicates that the labeled edge (132B) corresponds to a violation of the predicate (122) identified by the predicate ID (124).

Using the predicate ID (124) in the encoding (150) is space efficient. For example, storing the predicate ID (124) in a data structure that represents the encoding (150) requires less space than storing the predicate (122), since the predicate (122) may require a significant amount of storage to store an arbitrarily complex expression. In other words, the predicate ID (124) may be used as a compressed representation of the predicate (122).

Returning to FIG. 1A, in one or more embodiments, the call graph (130) may be any dependency graph whose edges (132B, 132Y) are annotated with conditions (e.g., predicates (122)). For example, the conditions may correspond to functions that are indirect call targets. That is, the dependency graph edges may be labeled with close parenthesis labels to encode conditions under which each indirect call target may be invoked, and open parenthesis labels to encode violations of the conditions.

In one or more embodiments, the GUI (104) is an interface for receiving a query (142) from a user and presenting a report (144) to the user. The query (142) may specify one or more functions. For example, the query (142) may ask whether a sink function is reachable from a source function. The sink function and the source function may be any functions in the source code (110). Continuing this example, the report (144) corresponding to the query may include one or more call paths between the source function and the sink function. Further continuing this example, the sink function may be a security-sensitive function and the source function may be a potential taint source. As another example, the query (142) may request all sink functions reachable from a source function. Continuing this example, the report (144) corresponding to the query may include one or more call paths between the source function and each sink function reachable from the source function. Alternatively, the report (144) corresponding to the query may simply list each sink function reachable from the source function. As yet another example, the query (142) may request all source functions that may reach a sink function.

In one or more embodiments, the code analyzer (106) is implemented in hardware (e.g., circuitry), software, firmware, and/or any combination thereof. The code analyzer (106) may be implemented as part of a compiler. In one or more embodiments, the code analyzer (106) includes functionality to traverse and/or modify a call graph (130). In one or more embodiments, the code analyzer (106) includes a constraint solver (146). The constraint solver (146) may include functionality to find a solution that satisfies a collection (e.g., a conjunction) of predicates (122). The solution may assign values to parameters (126) of the predicates (122). For example, the predicates (122) may correspond to call sites (112A, 112N) in a call path. The collection of predicates (122) may be referred to as the path condition of the call path.

In one or more embodiments, the code analyzer (106) includes a path analyzer (148). The path analyzer (148) may include functionality to determine whether a call path includes an edge labeled with a close parenthesis label (152) and a matching edge labeled with an open parenthesis label (154), where both the close parenthesis label (152) the open parenthesis label (154) correspond to the same predicate ID (124). In one or more embodiments, the path analyzer (148) is implemented using dynamic programming with memorization. Memorization is a technique for improving the performance of a recursive algorithm (e.g., an algorithm that traverses and processes the edges of a graph) by storing partial results in an array. The partial results may be retrieved from the array instead of being recalculated, thereby avoiding calculating the same partial result more than once. In one or more embodiments, the path analyzer (148) is implemented using a modified version of an algorithm that solves context-free language (CFL) reachability problems. In a CFL reachability problem, a path is considered to connect two nodes when the concatenation of the labels on the edges of the path is a word in a particular context-free language. CFL reachability algorithms are typically optimized to encode feasible paths. However, in one or more embodiments, the encodings (136B, 136Y) are used to represent infeasible paths using matched open parenthesis labels (154) and closed parenthesis labels (152), in order to reduce storage requirements, since in a typical call graph (130), the number of feasible call paths far exceeds the number of infeasible call paths. Thus, the path analyzer (148) may be implemented by adapting standard CFL reachability algorithms.

In one or more embodiments, the computer processor (108) includes functionality to execute the source code (110). In one or more embodiments, the computer processor (108) includes functionality to execute the code analyzer (106).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
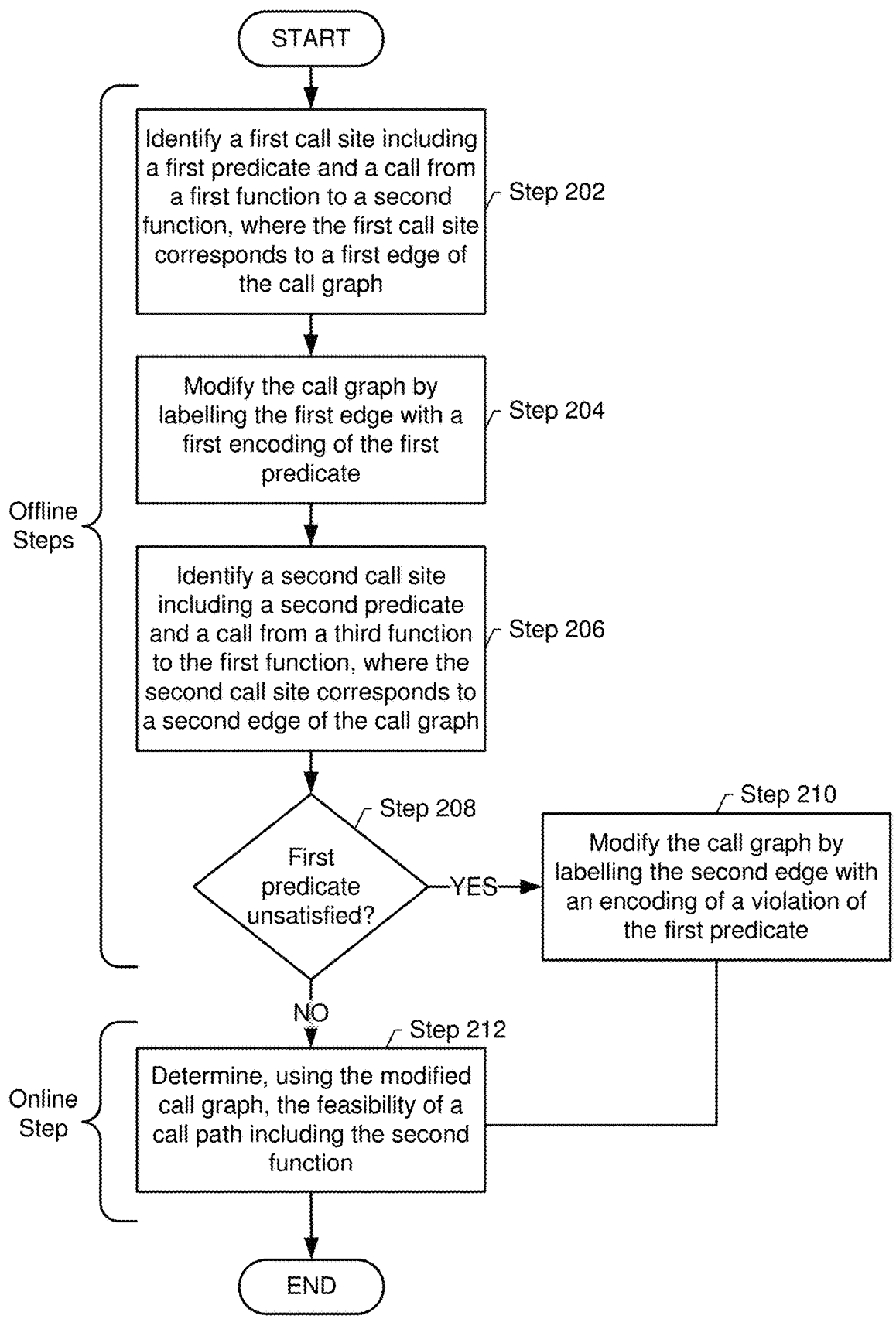
FIG. 2 shows a flowchart in accordance with one or more embodiments of the invention.

FIG. 2 shows a flowchart in accordance with one or more embodiments of the invention. The flowchart depicts a process for modifying a call graph. One or more of the steps in FIG. 2 may be performed by the components (e.g., the code analyzer (106) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

The steps shown in FIG. 2 are divided into offline steps and online steps. The offline steps, including Step 202, Step 204, Step 206, Step 208, and Step 210, may incur significant computational overhead while modifying the call graph and determining whether predicates are satisfied at various call sites. The modified call graph is then used during the execution of the online step, Step 212, which performs a quick determination regarding the feasibility of a call path.

Initially, in Step 202, a first call site is identified in source code. The first call site corresponds to a first edge of a call graph generated for the source code. The first edge connects a first node corresponding to a first function to a second node corresponding to a second function. Because the code analyzer traverses the call graph in a backward fashion, in one or more embodiments, the first edge is a leaf edge in the call graph. The code analyzer may identify the first call site in the source code using the call site ID corresponding to the first edge. The first call site includes a first predicate and a call from the first function to the second function. In other words, the first call site may be a conditional call site such that the call from the first function to the second function is executed when the first predicate is satisfied. In one or more embodiments, the code analyzer executes the offline steps for each leaf edge in the call graph.

In Step 204, the call graph is modified by labelling the first edge with a first encoding of the first predicate. The first encoding may be a close parenthesis label that includes the predicate ID of the first predicate. The code analyzer may use the first encoding in Step 212 below to determine the feasibility of call paths that include the first edge. In one or more embodiments, the code analyzer examines each edge in the call graph and labels the edge with a close parenthesis label that includes the predicate ID of the predicate of the call site corresponding to the edge.

In Step 206, a second call site is identified in the source code (see description of Step 202 above). The second call site corresponds to a second edge of the call graph. The second edge connects the second node and a third node corresponding to a third function. The second call site includes a second predicate and a call from the third function to the first function. The second call site may correspond to a second edge that is connected to the first edge. For example, the code analyzer may traverse the call graph backwards from the first edge to a second edge connected to the first edge. In one or more embodiments, the code analyzer executes Step 206, Step 208, and Step 210 for each call site corresponding to an edge connected to the first edge (e.g., each call site whose called function is the first function).

If, in Step 208, it is determined, using the second call site, that the first predicate is unsatisfied, then Step 210 below is executed. The code analyzer may determine that the first predicate is unsatisfied by determining the path condition of the call path that includes the first call site and the second call site. The code analyzer may determine the path condition by modifying the first predicate as follows:

i.) replacing one or more parameters of the first predicate with corresponding arguments passed by the third function to the first function.

ii.) conjoining the first predicate with the second predicate.

In one or more embodiments, the code analyzer constructs a worklist including nodes corresponding to sink functions that represent starting points for backward traversal of call paths in the call graph. For each node in the worklist, the code analyzer may collect the edges leading to that node. For each such edge, the code analyzer may generate the path condition for that edge. The code analyzer then determines whether the path condition (e.g., the modified first predicate) is satisfied using a constraint solver. If the code analyzer cannot determine whether the path condition is satisfied, then the code analyzer may add the calling function of the first call site and the modified first predicate to a worklist for subsequent processing by the offline steps, as the code analyzer recursively explores (e.g., extends) call paths that include the first call site. The code analyzer may add, to the worklist, the node corresponding to the calling function of the edge. The process continues until the worklist is empty.

In Step 210, the call graph is modified by labelling the second edge with a second encoding of a violation of the first predicate. The second encoding may be an open parenthesis label that includes the predicate ID of the first predicate. The code analyzer may use the second encoding in Step 212 below to determine the feasibility of call paths that include the second edge.

In Step 212, the feasibility of a call path including the second function is determined, using the modified call graph. The path analyzer may determine the feasibility of the call path by determining whether the call path includes an edge labeled with a close parenthesis label and a matching edge labeled with an open parenthesis label, where both the close parenthesis label and the open parenthesis label correspond to the same predicate ID.

The code analyzer may determine the feasibility of the call path in response to receiving a query that includes the second function. For example, the query may ask whether the second function is reachable from a specific source function. Continuing this example, the code analyzer may detect a taint flow in the call path when the second function is a security-sensitive function, and the specific source function is a taint source. As an alternative example, the query may request all source functions that may reach the second function.

Determining the feasibility of the call path is quick and efficient, since the offline steps already computed the path conditions corresponding to the call path, and encoded the results (e.g., which predicates were violated) in close parenthesis labels and open parenthesis labels on the edges of the call path. Due to this efficiency, determining the feasibility of the call path scales to large call graphs, which may be analyzed completely and accurately (e.g., without ignoring any edges). When applied to a large codebase including over 200,000 call sites, the online step (Step 212) generated results for queries in a few seconds, and the offline steps were performed in under two minutes. Furthermore, determining the feasibility of the call path is space-efficient, due to the compressed, encoded labels of predicates and predicate violations attached to edges of the call graph. For example, when applied to the same large codebase, 2 megabytes of call site predicates were reduced to 294 kilobytes of labels.

Figure 4A:
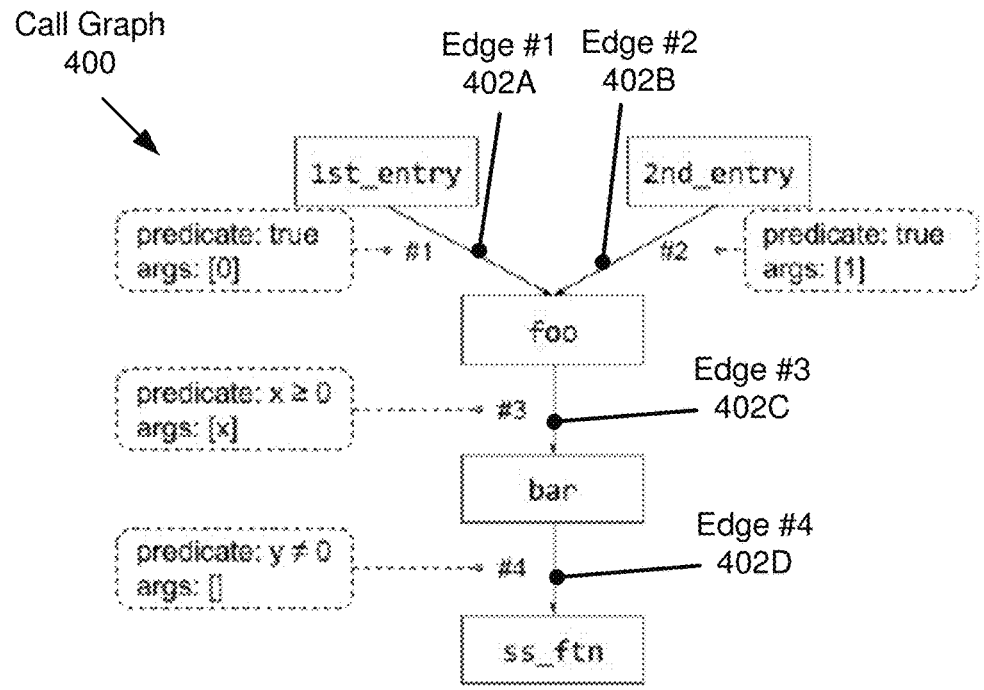
Figure 4B:
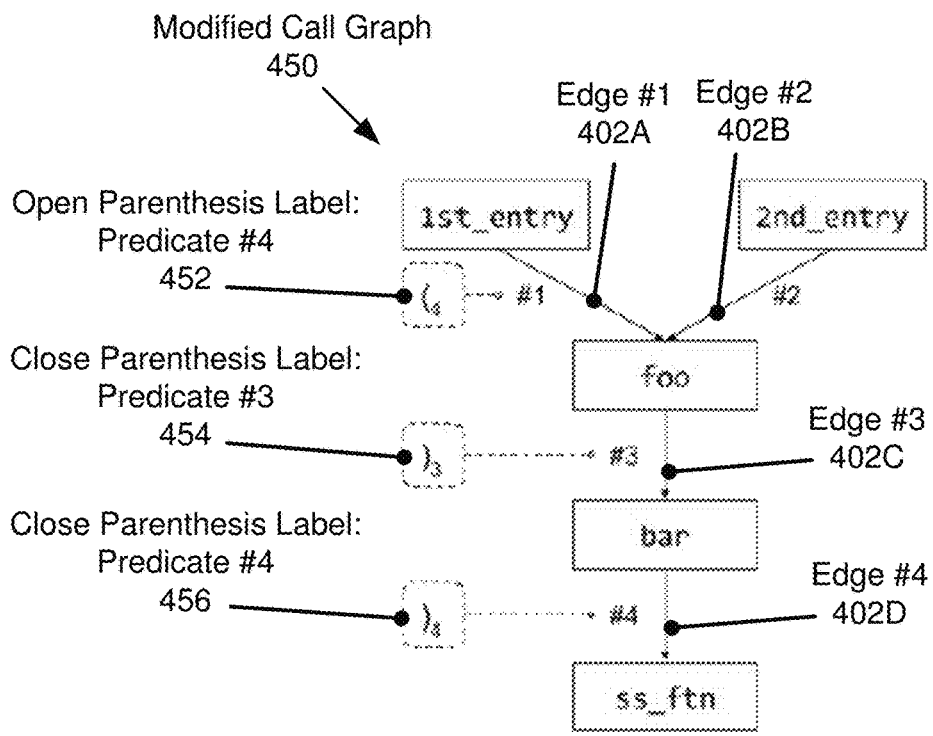

The following example is for explanatory purposes only and not intended to limit the scope of the invention. FIG. 3, FIG. 4A, and FIG. 4B show implementation examples in accordance with one or more embodiments of the invention. FIG. 3 shows source code (300) ((110) in FIG. 1A) that includes call sites (302A, 302B, 302C, 302D) ((112A, 112N) in FIG. 1A) and predicates (304C, 304D) ((122) in FIG. 1A). Call site #1 (302A) corresponds to an unconditional call, where the function foo is always invoked, once the function first_entry is entered. Similarly, call site #2 (302B) corresponds to an unconditional call, where the function foo is always invoked, once the function second_entry is entered. In contrast, call site #3 (302C) corresponds to a conditional call, where the function bar may be invoked, depending on the value of predicate #3 (304C). Similarly, call site #4 (302D) corresponds to a conditional call, where the function security_sensitive_ftn may be invoked, depending on the value of predicate #4 (304D).

FIG. 4A shows a call graph (400) ((130) in FIG. 1A) that includes edges (402A, 402B, 402C, 402D) ((132B, 132Y) in FIG. 1A) corresponding to the call sites (302A, 302B, 302C, 302D) of FIG. 3. FIG. 4B shows a modified call graph (450) that labels three edges (402A, 402C, 402D) of the call graph (400) of FIG. 4A with encodings.

The code analyzer initially adds close parenthesis labels to edges corresponding to call sites with conditional calls. Thus, the code analyzer labels edge #3 (402C) with close parenthesis label #3 (454) ((152) in FIG. 1B), since edge #3 (402C) corresponds to call site #3 (302C) in FIG. 3, which is invoked when predicate #3 (304C) is true. Similarly, the code analyzer labels edge #4 (402D) with close parenthesis label #4 (456), since edge #4 (402D) corresponds to call site #4 (302D), which is invoked when predicate #4 (304D) is true. The code analyzer adds, to a worklist, the calling function of each call site, in this case foo and bar.

When the code analyzer processes the worklist entry (bar), the code analyzer first searches for a function that calls bar by finding an edge connected to edge #4 (402D). Edge #3 (402C) is connected to edge #4 (402D). Edge #3 (402C) corresponds to call site #3 (302C). bar is called at call site #3 (302C) with argument x if and only if predicate #3 "x>=0" (304C) is true. Thus, the code analyzer updates predicate #4 "y!=0" (304D) of call site #4 (302D) by replacing y with x and conjoining with predicate #3 "x>=0" (304C). The updated predicate is "x>0", for which the constraint solver cannot yet determine a value, since the value of the parameter x is unknown. Thus, the code analyzer adds foo back to the worklist with "x>0".

When reprocessing foo added to the worklist, the constraint solver evaluates the updated predicate "x>0" in the context of call site #1 (302A). At call site #1 (302A), the function foo is called with argument 0. The code analyzer labels edge #1 (402A) with an open parenthesis label for predicate #4 (452) ((154) in FIG. 1B) because the updated predicate "x>0" evaluates to false, which caused predicate #4 "y!=0" (304D) to be unsatisfied. Thus, the call path consisting of edge #1 (402A), edge #3 (402C), and edge #4 (402D) is infeasible.

In contrast, at call site #2 (302B), the function foo is called with argument 1. The code analyzer does not label edge #2 (402B) because the updated predicate "x>0" evaluates to true, which satisfies predicate #4 "y!=0" (304D). Thus, the call path consisting of edge #2 (402B), edge #3 (402C), and edge #4 (402D) is feasible. When a user submits a query regarding which functions may reach security_sensitive_ftn, the code analyzer returns a report that includes the feasible call path consisting of edge #2 (402B), edge #3 (402C), and edge #4 (402D). If the code analyzer determines that the function second_entry is a taint source, then the code analyzer detects a taint flow along the feasible call path from second_entry to security_sensitive_ftn.

Figure 5A:
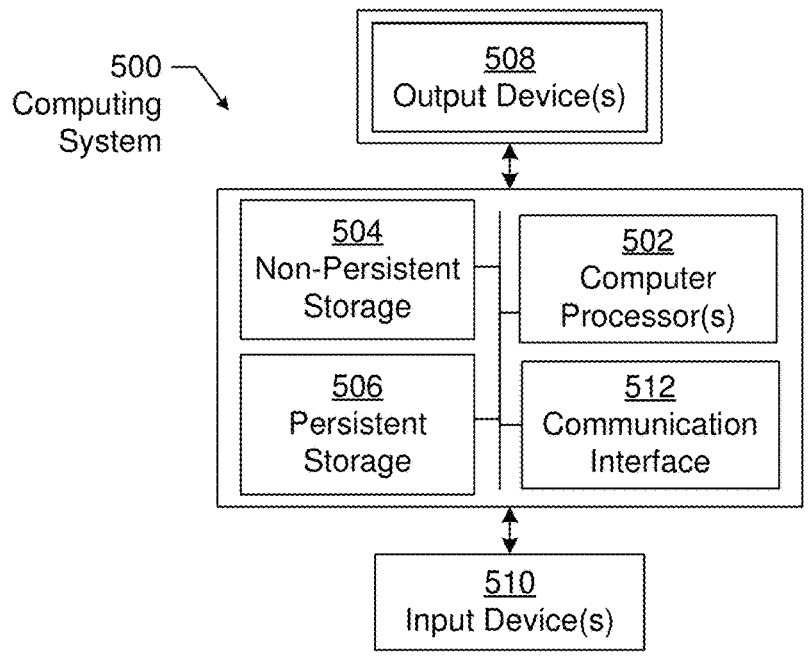
FIG. 5A and FIG. 5B show computing systems in accordance with one or more embodiments of the invention.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
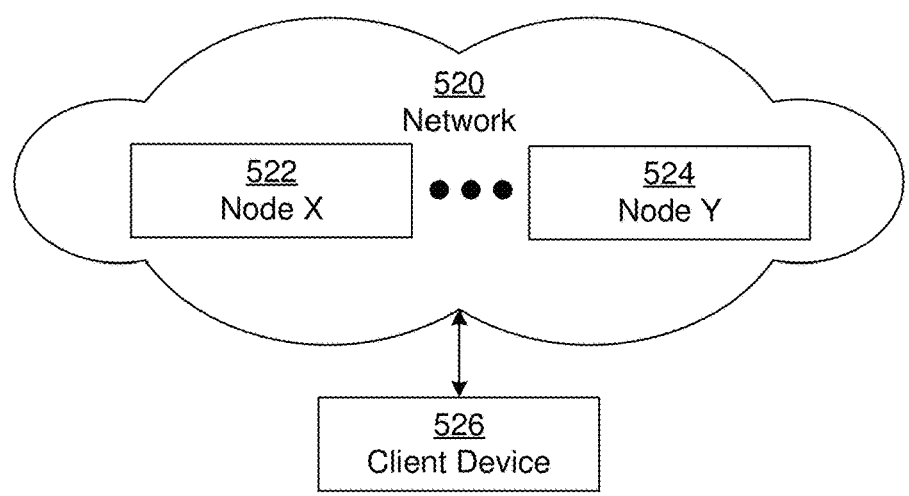

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for modifying a call graph, comprising:
   identifying, in source code, a first call site comprising a first predicate and a call from a first function to a second function, the first call site corresponding to a first edge of the call graph, the first edge connecting a first node corresponding to the first function and a second node corresponding to the second function, the first predicate comprising a Boolean expression, the call graph generated for the source code;
   modifying the call graph by labelling the first edge with a first encoding of the first predicate;
   identifying, in the source code, a second call site comprising a second predicate and a call from a third function to the first function, the second call site corresponding to a second edge of the call graph;
   while recursively traversing the call graph until a worklist is empty, collecting, for a plurality of nodes in the worklist, a plurality of edges of the call graph leading to the plurality of nodes;
   generating, for the plurality of edges, a plurality of path conditions comprising a path condition corresponding to (i) the first edge and (ii) a call path comprising the first call site and the second call site;
   determining, using a constraint solver, that the path condition is unsatisfied, wherein the constraint solver comprises functionality to find a solution that satisfies a conjunction of predicates; and in response to determining that the path condition is unsatisfied:
   adding the first node to the worklist,
   determining that the first predicate is unsatisfied, and in response to determining that the first predicate is unsatisfied, modifying the call graph by labelling the second edge with a second encoding of a violation of the first predicate.

2. The method of claim 1, further comprising:
determining, using the modified call graph, the feasibility of the call path.

3. The method of claim 2, wherein determining the feasibility of the call path comprises:
determining whether the call path comprises an edge labeled with an encoding of a predicate and an edge labeled with an encoding of a violation of the predicate.

4. The method of claim 2, further comprising:
detecting a taint flow in response to determining the feasibility of the call path, wherein the call path comprises a potentially tainted function, and wherein the second function is security-sensitive.

5. The method of claim 2, further comprising:
receiving a query based on the second function, wherein the feasibility of the call path is determined in response to receiving the query.

6. The method of claim 1, wherein the first predicate comprises a parameter, and wherein the third function calls the first function with an argument, the method further comprising:
modifying the first predicate by replacing the parameter with the argument to obtain a modified first predicate; and
determining that the conjunction of the modified first predicate and the second predicate is unsatisfied.

7. The method of claim 1, wherein the first encoding is based on a location of the first predicate in the source code.

8. A system for modifying a call graph, comprising:
a computer processor;
a repository configured to store:
   source code comprising:
      a first call site comprising a first predicate and a call from a first function to a second function, the first call site corresponding to a first edge of the call graph, the first edge connecting a first node corresponding to the first function and a second node corresponding to the second function, the first predicate comprising a Boolean expression, and
      a second call site comprising a second predicate and a call from a third function to the first function, the second call site corresponding to a second edge of the call graph,
   wherein the call graph is generated for the source code;
a constraint solver, executing on the computer processor and comprising functionality to find a solution that satisfies a conjunction of predicates; and
a code analyzer, executing on the computer processor and configured to:
   identify, in the source code, the first call site,
   modify the call graph by labelling the first edge with a first encoding of the first predicate,
   identifying, in the source code, the second call site,
   while recursively traversing the call graph until a worklist is empty, collect, for a plurality of nodes in the worklist, a plurality of edges of the call graph leading to the plurality of nodes,
   generate, for the plurality of edges, a plurality of path conditions comprising a path condition corresponding to (i) the first edge and (ii) a call path comprising the first call site and the second call site,
   determine, using the constraint solver, that the path condition is unsatisfied, wherein the constraint solver comprises functionality to find a solution that satisfies a conjunction of predicates, and
   in response to determining that the path condition is unsatisfied:
      add the first node to the worklist,
      determine that the first predicate is unsatisfied, and
      in response to determining that the first predicate is unsatisfied, modify the call graph by labelling the second edge with a second encoding of a violation of the first predicate.

9. The system of claim 8, wherein the system further comprises a path analyzer, executing on the computer processor and configured to determine, using the modified call graph, the feasibility of the call path.

10. The system of claim 9, wherein the path analyzer is further configured to:
determine whether the call path comprises an edge labeled with a predicate and an edge labeled with a violation of the predicate.

11. The system of claim 9, wherein the code analyzer is further configured to:
detect a taint flow in response to determining the feasibility of the call path, wherein the call path comprises a potentially tainted function, and wherein the second function is security-sensitive.

12. The system of claim 9, further comprising a graphical user interface (GUI), executing on the computer processor and configured to:
receive a query based on the second function,
wherein the path analyzer determines the feasibility of the call path in response to receiving the query.

13. The system of claim 8, wherein the first predicate comprises a parameter, wherein the third function calls the first function with an argument, and wherein the path analyzer is further configured to:
modify the first predicate by replacing the parameter with the argument to obtain a modified first predicate, and
determine that the conjunction of the modified first predicate and the second predicate is unsatisfied.

14. A non-transitory computer readable medium comprising instructions that, when executed by a computer processor, perform:
identifying, in source code, a first call site comprising a first predicate and a call from a first function to a second function, the first call site corresponding to a first edge of a call graph, the first edge connecting a first node corresponding to the first function and a second node corresponding to the second function, the first predicate comprising a Boolean expression, the call graph generated for the source code;
modifying the call graph by labelling the first edge with a first encoding of the first predicate;
identifying, in the source code, a second call site comprising a second predicate and a call from a third function to the first function, the second call site corresponding to a second edge of the call graph;
while recursively traversing the call graph until a worklist is empty, collecting, for a plurality of nodes in the worklist, a plurality of edges of the call graph leading to the plurality of nodes;

generating, for the plurality of edges, a plurality of path conditions comprising a path condition corresponding to (i) the first edge and (ii) a call path comprising the first call site and the second call site;

determining, using a constraint solver, that the path condition is unsatisfied, wherein the constraint solver comprises functionality to find a solution that satisfies a conjunction of predicates; and in response to determining that the path condition is unsatisfied:
- adding the first node to the worklist,
- determining that the first predicate is unsatisfied, and
- in response to determining that the first predicate is unsatisfied, modifying the call graph by labelling the second edge with a second encoding of a violation of the first predicate.

15. The non-transitory computer readable medium of claim 14, wherein the instructions further perform:
determining, using the modified call graph, the feasibility of the call path.

16. The non-transitory computer readable medium of claim 15, wherein determining the feasibility of the call path comprises:
determining whether the call path comprises an edge labeled with an encoding of a predicate and an edge labeled with an encoding of a violation of the predicate.

17. The non-transitory computer readable medium of claim 15, wherein the instructions further perform:
detecting a taint flow in response to determining the feasibility of the call path, wherein the call path comprises a potentially tainted function, and wherein the second function is security-sensitive.

18. The non-transitory computer readable medium of claim 14, wherein the first predicate comprises a parameter, and wherein the third function calls the first function with an argument, and wherein the instructions further perform:
modifying the first predicate by replacing the parameter with the argument to obtain a modified first predicate; and
determining that the conjunction of the modified first predicate and the second predicate is unsatisfied.

* * * * *